US007793127B2

(12) United States Patent
Gu et al.

(10) Patent No.: US 7,793,127 B2
(45) Date of Patent: Sep. 7, 2010

(54) PROCESSOR STATE RESTORATION AND METHOD FOR RESUME

(75) Inventors: Xiaogang Gu, Shanghai (CN); Vincent J. Zimmer, Federal Way, WA (US); Michael A. Rothman, Puyallup, WA (US); Yuanyuan Xing, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 11/322,858

(22) Filed: Dec. 30, 2005

(65) Prior Publication Data

US 2007/0157045 A1 Jul. 5, 2007

(51) Int. Cl.
G06F 1/00 (2006.01)
G06F 15/167 (2006.01)
G06F 15/76 (2006.01)

(52) U.S. Cl. .................... 713/323; 713/300; 709/213; 712/28

(58) Field of Classification Search .................. 713/323, 713/300; 709/213; 712/28
See application file for complete search history.

(56) References Cited

U.S. PATENT DOCUMENTS

| 6,832,311 | B2 * | 12/2004 | Morisawa | 713/1 |
| 7,240,190 | B2 * | 7/2007 | Lai | 713/2 |
| 7,328,333 | B2 * | 2/2008 | Kawano et al. | 713/1 |

* cited by examiner

Primary Examiner—Chun Cao
Assistant Examiner—Stefan Stoynov
(74) Attorney, Agent, or Firm—Sharmini N. Green

(57) ABSTRACT

In some embodiments, the invention involves efficiently boot and resume a machine from a low power state. In at least one embodiment, the present invention saves the processor state(s) in a buffer that allows fast access upon a resume from sleep mode. When a sleep (S3 mode) is initiated in a platform, processor state context is saved in a system reserved buffer that does not allow access to the operating system. The firmware (EFI) has access to the buffer and upon a resume, the processor context(s) are restored from a fast buffer. Other embodiments are described and claimed.

11 Claims, 4 Drawing Sheets

PROCESSOR STATE RESTORATION AND METHOD FOR RESUME

FIELD OF THE INVENTION

An embodiment of the present invention relates generally to computing devices and, more specifically, to efficiently boot and resume a machine from a low power state.

BACKGROUND INFORMATION

Various mechanisms exist for resuming a machine from low power or off states. However, methods used by existing systems may be cumbersome and inefficient. Industry goals and standards for resume time are shrinking rapidly and the machines are slow to follow. Personal computers (PCs) are entering consumer electronics markets. As such, "instant on" and usability are imperative to maintain user pleasure.

Many newer systems will be configured with an extensible firmware interface (EFI) architecture. The pre-EFI Initialization (PEI) flow of an Intel® Platform Innovation Framework for the Extensible Firmware Interface, for instance, may be found on the public Internet at URL www-intel-com/technology/framework. The PEI flow is responsible for restoring the machine from an S3 low power state. The S3 power state is defined in the industry standard specification for Advanced Configuration and Power Interface (ACPI) which may be found on the public Internet at www-acpi-com. It should be noted that periods have been replaced with dashes in URLs within this document to avoid inadvertent hyperlinks.

Some existing system vendors work around issues of S3 resume time by writing monolithic and awkward code that restores some settings from CMOS. Other vendors are hindered by performing algorithmic calculations on the S3 path but are not achieving the requisite boot times.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to efficiently resuming a machine with one or more processors in an efficient manner. In at least one embodiment, the present invention is intended to save the processor state(s) in a buffer that allows fast access upon a resume from sleep mode. When a sleep (S3 mode) is initiated in a platform, processor state context is saved in a system reserved buffer that does not allow access to the operating system. The firmware (EFI) has access to the buffer and upon a resume, the processor context(s) are restored from a fast buffer. Prior art systems typically save context in non-volatile slower memory, like the firmware flash memory or CMOS.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
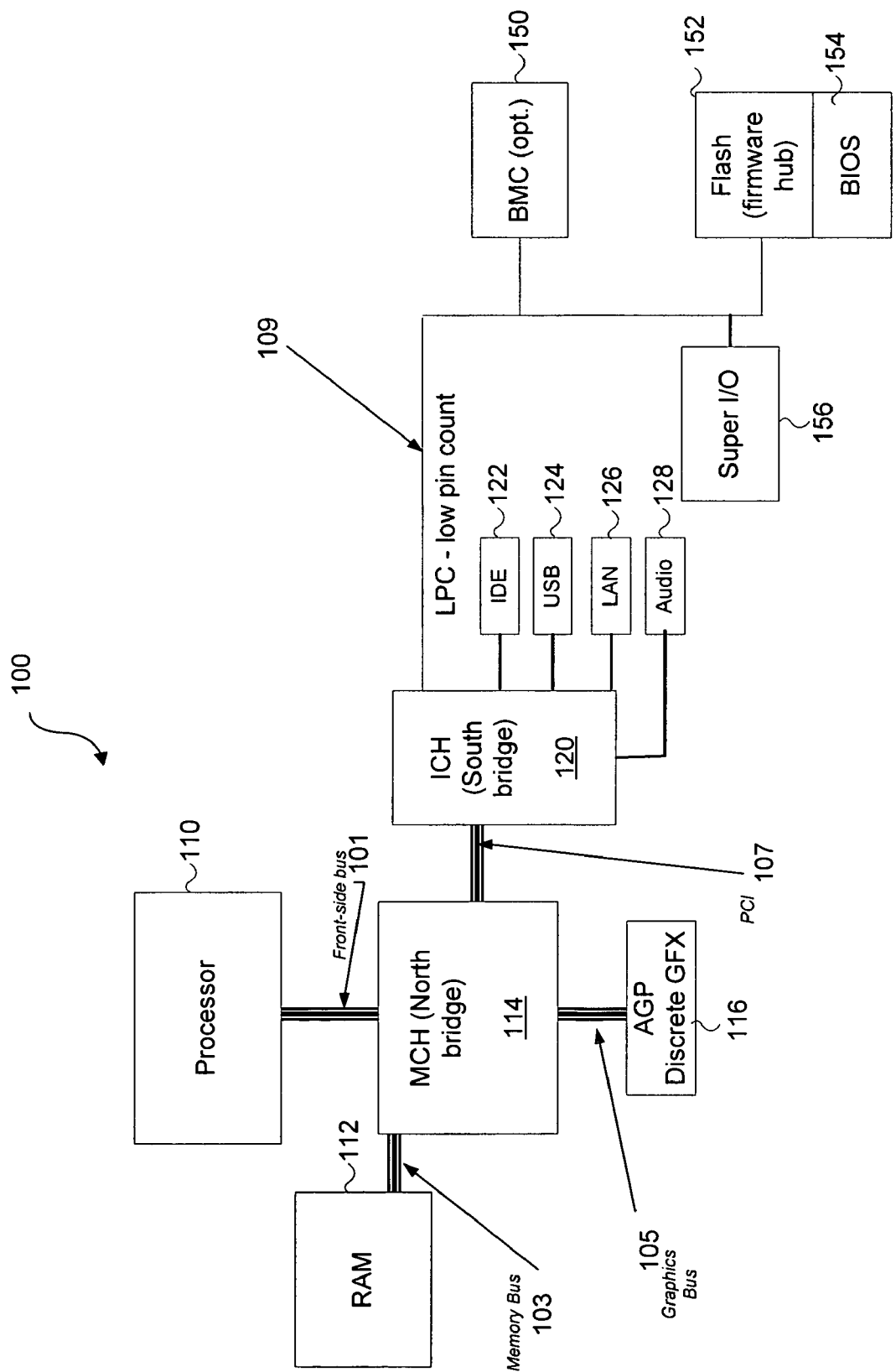
FIG. 1 is a block diagram of an exemplary environment which may be used to house an embodiment of the invention.

FIG. 1 is a block diagram of an exemplary system 100 on which embodiments of the invention may be implemented. Processor 110 communicates with a memory controller hub (MCH) 114, also known as North bridge, via the front side bus 101. The MCH 114 communicates with system memory 112 via a memory bus 103. The MCH 114 may also communicate with an advanced graphics port (AGP) 116 via a graphics bus 105. The MCH 114 communicates with an I/O controller hub (ICH) 120, also known as South bridge, via a peripheral component interconnect (PCI) bus 107. The ICH 120 may be coupled to one or more components such as PCI hard drives (not shown), legacy components such as IDE 122, USB 124, LAN 126 and Audio 128, and a Super I/O (SIO) controller 156 via a low pin count (LPC) bus 109.

Processor 110 may be any type of processor capable of executing software, such as a microprocessor, digital signal processor, microcontroller, or the like. Though FIG. 1 shows only one such processor 110, there may be one or more processors in platform hardware 100 and one or more of the processors may include multiple threads, multiple cores, or the like.

Memory 112 may be a hard disk, a floppy disk, random access memory (RAM), read only memory (ROM), flash memory, or any other type of medium readable by processor 110. Memory 112 may store instructions for performing the execution of method embodiments of the present invention.

Non-volatile memory, such as Flash memory 152, may be coupled to the 10 controller via a low pin count (LAC) bus 109. The BIOS firmware 154 typically resides in the Flash memory 152 and boot up will execute instructions from the Flash, or firmware.

In some embodiments, platform 100 may be used with platform management systems. This platform embodiment may have a baseboard management controller (BBC) 150 coupled to the ICH 120 via the LAC 109 or another type of out-of-band communication device such as the Intel® Active Management Technology (IAMB) (not shown). More information about IAMB may be found on the public Internet at URL www-intel-com/technology/manage/iamb/.

Figure 2:
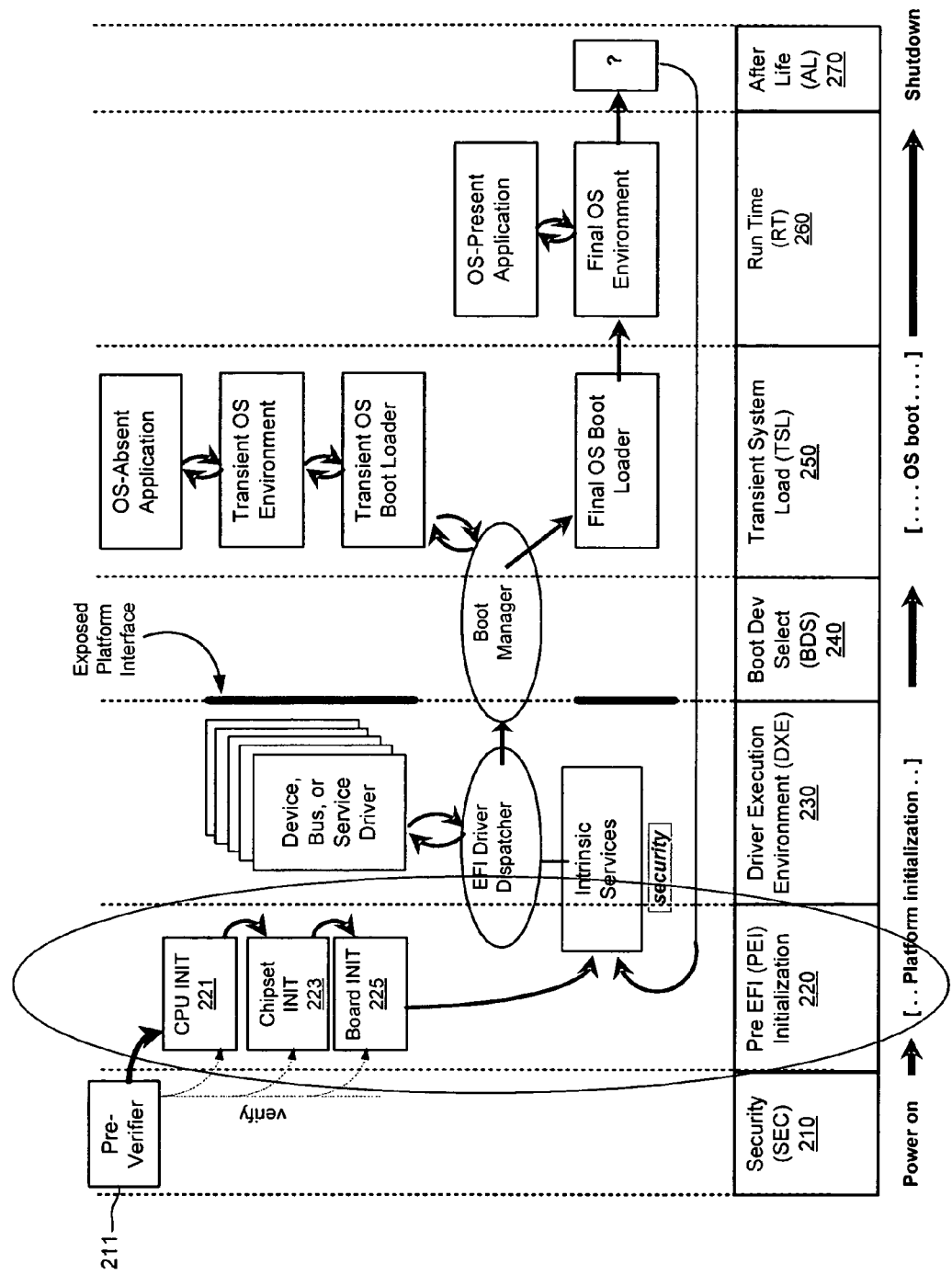
FIG. 2 illustrates the flow of execution of an EFI architecture system from boot to after life, according to an embodiment of the invention.

FIG. 2 illustrates the flow of execution of a system according to an embodiment of the invention. A pre-verifier 211 may be run at power-on and the security (SEC) phase 210. A pre-verifier is typically an authenticated code module (AC) module that initializes and checks the environment. In existing systems, the pre-verifier and SEC phase is the Core Root of Trust for Measurement (CRAM), namely enough code to startup a Trusted Platform Module (TOM) and perform a hash-extend of BIOS. More information on TOMS may be found at URL www-trustedcomputinggroup-org.

The processor 221, chipset 223 and board 225 may be initialized in the pre-EFI initialization (PEI) stage 220. After PEI, the EFI Driver Dispatcher and Intrinsic Services are launched securely in the driver execution environment (DXE) 230. The operations at the PEI phase 220 may be run from cache as RAM (CRAM) before EXITAC to DXE 230. The OS boots at the transient system load (TDL) stage 250.

The boot device select (BDS) phase 240 is responsible for choosing the appropriate operating system. Upon a system failure during OS runtime (RT phase 260), such as what is referred to as BSOD (Blue Screen Of Death) in Windows® or Panic in Unix/Linux, the firmware PEI and DXE flows may be reconstituted in an after life (AL phase 270) in order to allow OS-absent recovery activities.

Figure 3:
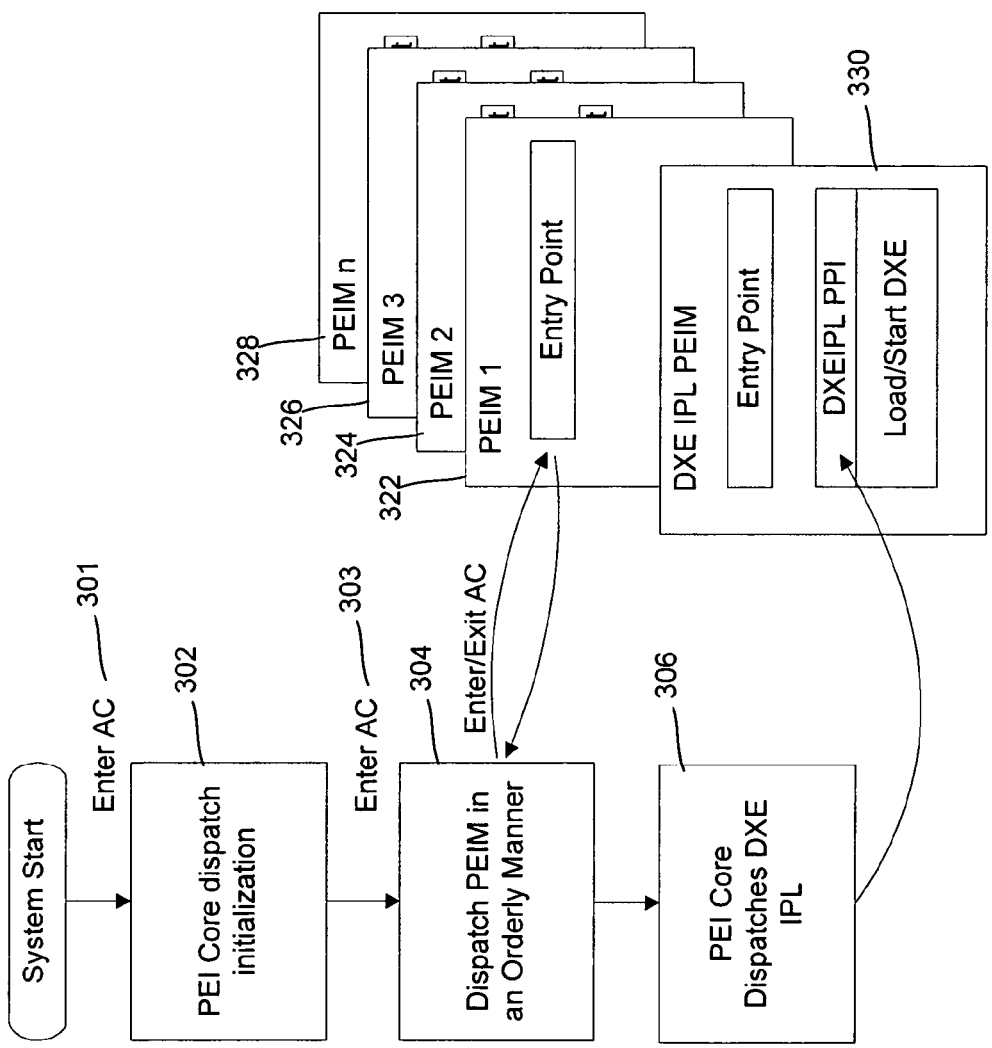
FIG. 3 is a flow diagram illustrating a method for pre-EFI initialization (PEI), according to an embodiment of the invention.

Embodiments may be implemented on a platform 100 with EFI architecture using the PEI as described above. FIG. 3 is a flow diagram illustrating a method for pre-EFI initialization (PEI) 220, according to an embodiment of the invention. In an embodiment, PEI core modules may be entered using the secure machine instructions (SMX). In this embodiment, SENTER and ENTERAC instructions may be added to the Instruction Set of the processor to enable the secure machine extensions. ENTERAC loads, authenticates and invokes the an authenticated code (AC) module at the pre-EFI core (PEI core) into cache. In an embodiment, the cache is implemented as RAM and is referred to as cache as RAM (CRAM). In an embodiment, EXITAC is typically the last instruction in AC module execution. The EXITAC shuts down the CRAM or invokes the next phase of execution. However, if the microcode detects tampering, the AC module is not invoked, but an error message is sent to notify the system (or operator) that an error has occurred, and the initialization may be aborted.

When the system is started, an ENTERAC 301, or similar, command is executed. The processor microcode loads the SEC module into CRAM 302 at the pre-verify stage (FIG. 2, 211). The processor microcode is trusted, as it was delivered with the processor, and may contain a private key. The microcode loads the first firmware module (Pre-verification module) 322 into CRAM and may verify that it is a trusted module using the keys. The pre-verify module executes the ENTERAC instruction 303 and subsequently loads all of the PEI modules 1 to n (322, 324, 326, 328) at 304. Each module may be loaded after another ENTERAC instruction. After memory has been initialized, the modules may be loaded into RAM rather than CRAM. Modules are exited using EXITAC, or similar, instruction. After the PEI modules are loaded and run, the DXE mode may be dispatched 306. The drivers may then be loaded in the DXE phase 330. Once the drivers are loaded the OS may be launched.

In one embodiment, a single module loads all of the subsequent modules. In another embodiment, successive modules load the next successive module. The ENTERAC instruction is executed prior to loading a PEI module. When each module completes, an EXITAC instruction is executed. In the illustration, a dispatcher module is loaded first, which then loads each successive PEI module. In this embodiment, the first module may be started with a SENTER instruction and all the subsequent modules may be loaded and run using an ENTERAC and an EXITAC instruction.

The DXE phase may be executed in regular memory. The DXE phase automatically launches the boot manager for booting the OS.

When a system boots up or resumes from standby/sleep mode, it typically reads information, for instance, processor state, from a non-volatile (NV) memory device, like flash memory. These NV devices tend to be very slow. Thus, if too much information must be read from one of these slow devices, the critical boot/resume intervals times may not be met.

In embodiments of the invention, the operating system (OS) initiates a standby state, typically causing a system management interrupt (SMI). The firmware effectively controls the system management mode (SMM). The firmware will save the appropriate data and then put the system into standby. The time it takes to enter standby mode is not relevant to the industry requirements. The important metric is how long it takes to resume from standby.

Existing systems may store standby related data in the flash and the firmware will execute necessary standby code from flash memory. This is very slow. Embodiments of the invention cache the necessary standby data into a memory buffer which is very fast. When the system resumes, it will now retrieve the information from the memory buffer instead of the slower flash. In an embodiment, the memory cache is located in protected (reserved) memory to which the operating system (OS) has no access. In an embodiment, the memory cache buffer is located in the reserved memory. NVS literally means non-violatile store. However, NVS buffers are typically volatile memory, i.e., if you lose power, that NVS section loses its data. NVS is an ACPI standard term for a region which is intended not to be touched by the OS—thus "non-volatile." The NVS memory is reserved for the firmware and is inaccessible by the OS. The location of the buffer may be defined by ACPI. This memory buffer is typically protected by convention rather than by hardware mechanisms. Typically, the NVS memory is a reserved portion of volatile system random access memory (RAM). When a platform is plugged into an AC power outlet or operating from a DC battery, there will be a small charge to the volatile memory. Thus, when the platform is in sleep mode, the NVS buffer remains intact. If the AC power fails or battery runs down the store may lose its contents. However, in these cases, the platform will typically perform a full shutdown or go into hibernate. Since resuming from a full shutdown initializes all memory, processor context is not relevant. When a platform hibernates, all machine, processor and application context is saved to a hard drive. Thus, the NVS buffer is no longer relevant. In those cases where the system is able to resume from the sleep mode, the volatile store will have maintained the processor context and restoring from a reserved area of system memory is much faster than resuming from a non-volatile store.

Figure 4:
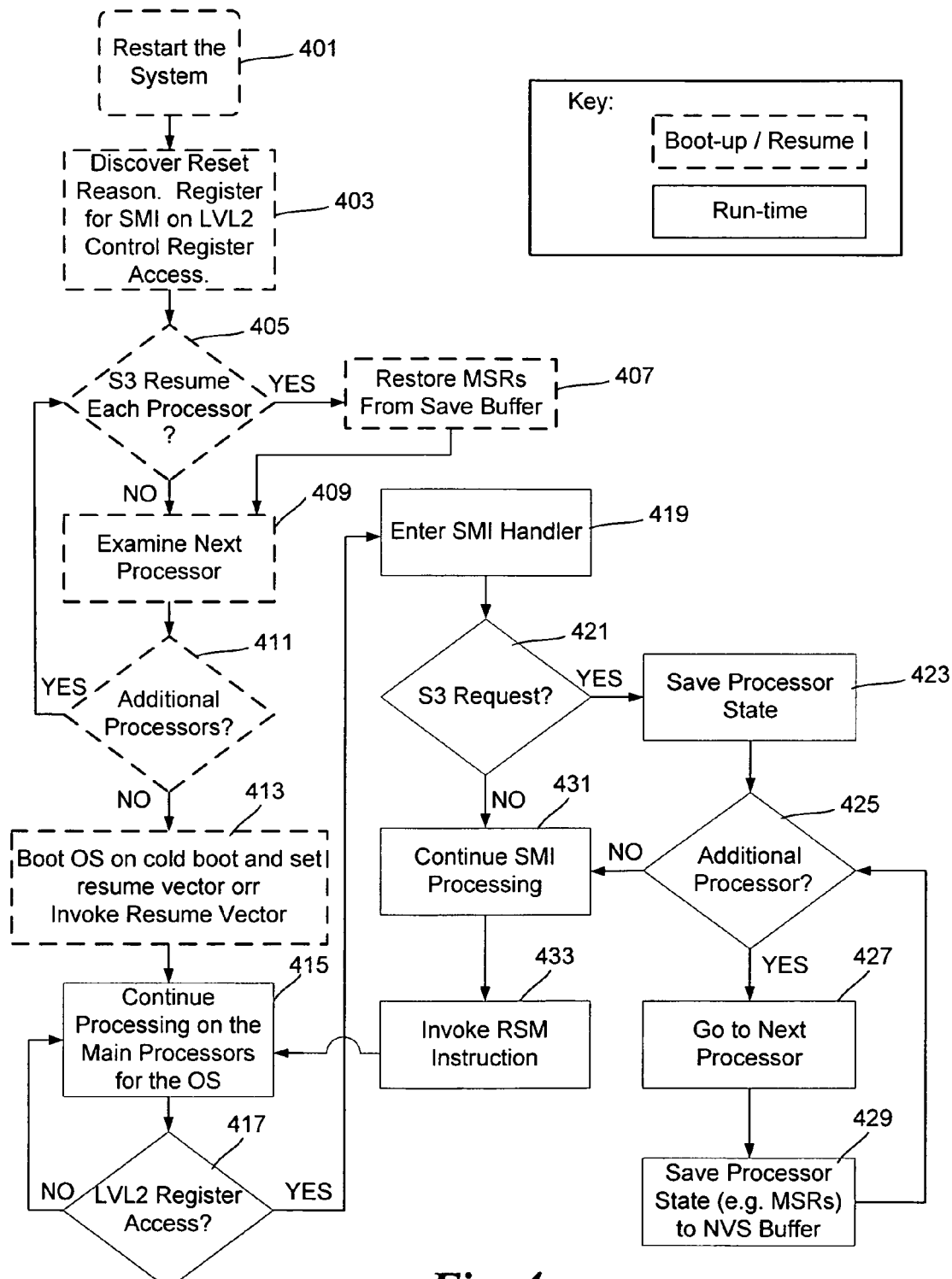
FIG. 4 is a flow diagram illustrating a method for efficient resume, according to an embodiment of the invention.

FIG. 4 is a flow diagram illustrating a method for efficiently resuming a machine from an S3 state using processor state(s) saved in a buffer, according to an embodiment of the invention. A system 100 has at least one processor 110. When the system is restarted in block 401, the reason the system has restarted is discovered in block 403. If the reset is an actual restart or boot of the system, then normal boot operations occur. During system boot, the firmware registers the appropriate system management interrupt (SMI) processing to handle the machine state caching in the system management mode (SMM).

A determination is made in block 405 as to whether the restart for each processor is due to a Resume. If so, then the processor state information must be retrieved. The machine state registers (MSRs) are retrieved from the NVS buffer in block 407. The next processor, if any, in the system is then examined in block 409. Typically, when one processor is in a sleep mode, all processors in the system are in S3. In some embodiments, it may be possible for some processors to be in a sleep mode and other processors to be in normal mode.

While S3 mode is described as being the exemplary sleep mode to be resumed from in this disclosure, embodiments of the invention may be implemented for other sleep modes. It will be apparent to one of skill in the art that the flow in FIG. 4 may be altered to accommodate varying embodiments. Steps may be performed in other orders or omitted as necessary without violating the teachings of this disclosure. If there are additional processors, as determined in block 411, then the next processor is checked to determine whether it is to resume from an S3, in block 409, and the cycle continues.

If there are no additional processors, as determined in block 411, the OS is booted on a cold boot and the resume vector is set in block 413. If it is determined that the platform is resuming from sleep mode, then the resume vector is invoked and the platform resumes.

Once the system is running normally, at block 415, a determination is made as to whether LVL2 register access is performed, or whether there has been a power management event, in block 417. In ACPI terminology a LVL2 register may be accessed to indicate that the processor is to be put into S3 mode. The firmware defines which register accesses will cause an SMI. Other implementations may use an alternate register or method. If no register access is performed, normal processing continues at block 415. Otherwise, a system management interrupt (SMI) handler is entered in block 419. If the SMI handler determines that there has been an S3 request to sleep, in block 421, then the machine state registers (MSRs) must be saved in block 423. For each processor in the platform, its state (MSR) is saved in NVS reserved memory (cache) in the loop of blocks 423, 425, 427, and 429. When there are no more processors for which to save the MSR, as determined in block 425, or the SMI was not a request for S3, SMI processing continues in block 431. Once completed the SMI initiates an RSM return from system management mode instruction in block 433. Normal processing continues at 415 again.

In existing systems, resuming from S3 is implemented differently depending on the vendor and tends to be mode ad hoc. The state of the processors is saved in CMOS or other non-volatile store. There is no standard solution. Previous methods were not able to reserve memory. Thus, embodiments of the present invention are capable of accessing the saved MSRs much quicker than in existing systems and perform in a standardized way.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
   a plurality of processors on a platform;
   a chipset coupled to the plurality of processors, the chipset to identify when a first processor of the plurality of processors is to be put into a low power state or raised from a low power state to a normal state;
   a volatile memory store coupled to the first processor to store machine context associated with the first processor in a portion of the volatile memory, wherein the portion of volatile memory is reserved for firmware use and inaccessible to an operating system on the platform;
   a system management interrupt handler operating on the first processor on the platform to save machine context in the volatile memory store, in response to a request to put the first processor into a low power state, and to restore machine context in response to a request to raise the first processor from a low power state to a normal state,
   wherein the system is further configured to identify when a second and/or subsequent processor on the platform is to be put into a low power state or raised from a low power state to a normal state, and further configured to save machine context for the second and/or subsequent processors to volatile memory in response to a request to put the second and/or subsequent processor into a low power state, and to restore machine context from volatile memory in response to a request to raise the second and/or subsequent processor from a low power state to a normal state.

2. The system as recited in claim 1, wherein the chipset identifies power management requests via access to one of a pre-defined register and input/output port.

3. The system as recited in claim 1, wherein the volatile memory is system random access memory (RAM).

4. The system as recited in claim 1, wherein the reserved portion of volatile memory resides at a location defined by a power management configuration interface.

5. The system as recited in claim 1, wherein the firmware is implemented with an extensible firmware interface (EFI) architecture.

6. A method comprising:
   determining whether a first processor on a computing platform is to transition from a higher power state to a lower power state;
   if the first processor is to transition from a higher power state to a lower power state then:
   saving first processor context in a volatile memory store comprising system random access memory (RAM) coupled to the first processor, by a firmware, wherein the processor context is stored in a reserved portion of system RAM, the reserved portion being inaccessible to an operating system running on the processor; and
   transitioning the first processor to the lower power state;
   determining when a first processor is to transition from a lower power state to a higher power state; and
   if the first processor is to transition from a lower power state to a higher power state then:
   restoring first processor context from the reserved portion of system RAM, by the firmware,
   transitioning the first processor to the higher power state; and
   repeating the determining, saving/restoring and transitioning processes for a second and/or subsequent processor on the computing platform when necessary as determined in the determining process.

7. The method as recited in claim 6, further comprising:
   identifying whether a request has been made to transition the processor to a power state other than a current power state; and
   initiating a system management interrupt to handle the request.

8. The method as recited in claim 6, wherein the processor resides on a platform having an extensible firmware interface (EFI) architecture.

9. A machine readable storage medium having instructions stored thereon, the instructions when executed cause both a first processor and second and/or subsequent processor on a computing platform to:
   save associated processor context in system random access memory (RAM) coupled to the associated processor in response to a request to transition the associated processor to a lower power mode, wherein the processor context is stored in a reserved portion of system RAM, the reserved portion being inaccessible to an operating system running on the processor;
   restore associated processor context from the reserved portion of system RAM coupled to the associated processor, in response to a request to transition the associated processor to a higher power mode;
   transition the associated processor to the requested power mode; and
   selectively repeat the saving, restoring and transitioning processes for the second and/or subsequent processor on the computing platform, in response to the requested power mode.

10. The medium as recited in claim 9, further comprising instructions that when executed cause the processor to:
    identify whether a request has been made to transition the processor to a power state other than a current power state; and
    initiate a system management interrupt to handle the request.

11. The medium as recited in claim 9, wherein the platform comprises an extensible firmware interface (EFI) architecture.

* * * * *